US008503360B2

United States Patent
Hou et al.

(10) Patent No.: US 8,503,360 B2
(45) Date of Patent: Aug. 6, 2013

(54) METHOD AND APPARATUS FOR FACILITATING MULTI-USER JOINT TRANSMIT-RECEIVE BEAMFORMING

(75) Inventors: Jilei Hou, San Diego, CA (US); Jinghu Chen, San Diego, CA (US); John E. Smee, San Diego, CA (US); Joseph B. Soriaga, San Diego, CA (US); Navid Hassanpour Ghady, New Haven, CT (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 12/492,657

(22) Filed: Jun. 26, 2009

(65) Prior Publication Data

US 2010/0329369 A1 Dec. 30, 2010

(51) Int. Cl.
*H04K 1/10* (2006.01)
*H04B 1/72* (2006.01)
*H04M 1/00* (2006.01)

(52) U.S. Cl.
USPC ........... 370/328; 375/260; 455/69; 455/562.1

(58) Field of Classification Search
USPC ................... 370/328; 375/260; 455/69, 562.1
See application file for complete search history.

(56) References Cited

U.S. PATENT DOCUMENTS

| | | | |
|---|---|---|---|
| 6,594,473 B1 * | 7/2003 | Dabak et al. | 455/101 |
| 8,089,925 B1 * | 1/2012 | Uhlik et al. | 370/329 |
| 8,130,666 B2 * | 3/2012 | Zhou et al. | 370/252 |
| 2007/0066229 A1 | 3/2007 | Zhang et al. | |
| 2008/0159425 A1 | 7/2008 | Khojastepour et al. | |
| 2008/0260051 A1 | 10/2008 | Boccardi et al. | |
| 2008/0292012 A1 | 11/2008 | Kim et al. | |
| 2011/0103503 A1 * | 5/2011 | Shin et al. | 375/267 |

OTHER PUBLICATIONS

International Search Report and Written Opinion—PCT/US2010/039868, International Search Authority—European Patent Office—Nov. 25, 2010.
Wu, Keying et al., "Joint Multiuser Precoding and Scheduling with Information at the Transmitter", IEEE VTC Spring 2008, May 2008, pp. 265-269.

* cited by examiner

*Primary Examiner* — Nizar Sivji
(74) *Attorney, Agent, or Firm* — Kenyon S. Jenckes; Mary A. Fales

(57) ABSTRACT

A method of wireless communication is disclosed that includes receiving detected channel information from a plurality of access terminals; selecting a set of access terminals from the plurality of access terminals based on the received channel information; creating a beamforming vector for each access terminal in the set of selected access terminals; and transmitting a signal using at least one of the created beamforming vectors. An apparatus for performing the method is also disclosed herein.

17 Claims, 10 Drawing Sheets

METHOD AND APPARATUS FOR FACILITATING MULTI-USER JOINT TRANSMIT-RECEIVE BEAMFORMING

BACKGROUND

I. Field

The following description relates generally to wireless communication systems, and more particularly, to a method and apparatus for facilitating multi-user joint transmit-receive beamforming.

II. Background

In order to address the issue of increasing bandwidth requirements that are demanded for wireless communication systems, different schemes are being developed to allow multiple user terminals to communicate with a single access point by sharing the channel resources while achieving high data throughputs. Multiple In, Multiple Out (MIMO) technology represents one such approach that has recently emerged as a popular technique for next generation communication systems.

Wireless communication systems may become multiple-access systems capable of supporting communication with multiple user terminals by sharing the available system resources (e.g., bandwidth and transmit power). These wireless communication systems may simultaneously support communication for multiple wireless communication devices where each wireless communication device may communicate with one or more base stations via transmissions on an uplink and a downlink. The uplink, which is also referred to as a reverse link, refers to the communication link from the wireless communication devices to the base stations, and the downlink, which is also referred to as a forward link, refers to the communication link from the base stations to the wireless communication devices. Examples of such multiple-access systems include code division multiple access (CDMA) systems, time division multiple access (TDMA) systems, frequency division multiple access (FDMA) systems, and orthogonal frequency division multiple access (OFDMA) systems.

From an information theory perspective, forward link transmission in wireless communication systems falls under the general scenario of broadcasting on a multi-user channel. It is known that for this scenario, serving multiple user terminals simultaneously with careful signal processing carried out at both the transmit and receive ends provides better performance than a TDMA approach, where only one user terminal is served per slot. For example, a good approach in single transmit antenna systems is super-position coding (SPC). In multiple transmit antenna systems such as MIMO systems, dirty-paper coding (DPC) has been identified as an optimal multi-user transmission strategy. DPC involves very high complexity as well as non-linear processing, where a modulo operation is required at both transmit and receive ends. Therefore, it is desirable to have linear beamforming schemes for multi-user terminal MIMO systems. However, current linear schemes are primarily Zero-Forcing (ZF)-based schemes, which may suffer from significant power loss.

Beamforming schemes for multi-user terminal MIMO systems typically involve each wireless communication device determining, and then feeding back to a base station, a transmit beamforming vector that it will use to communicate with the base station. The base station will then select all wireless communication devices to be served in the same slot by choosing all wireless communication devices with compatible transmit beamforming vectors. For example, the base station will choose wireless communication devices with transmit beamforming vectors having small spatial correlation so interference may be reduced.

An issue encountered with the above described approach is that when each wireless communication device decides on a respective transmit beamforming vector, the wireless communication device does not know what other wireless communication devices may be served with it in the same slot; therefore, a wireless communication device may select a beam that will maximize its own energy and neglect to take into account any interference that the selected beam will cause to other wireless communication devices. Consequently, interference mitigation is more or less taken into account only during the wireless communication device selection process by the base station, where the wireless communication devices with small spatial correlations are served together. In addition, the finite resolution of the transmit beamforming codebooks typically result in large residual interference, especially at a high signal to noise ratio (SNR) regime.

Consequently, it would be desirable to address one or more of the deficiencies described above.

SUMMARY

According to various aspects, the subject innovation relates to systems and/or methods for facilitating multi-user joint transmit-receive beamforming. The base station is associated with a plurality of access terminals, According to another aspect of the disclosure, a method of facilitating multi-user joint transmit-receive beamforming is provided. The method includes receiving detected channel information from a plurality of access terminals; selecting a set of access terminals from the plurality of access terminals based on the received channel information; creating a beamforming vector for each access terminal in the set of selected access terminals; and transmitting a signal using at least one of the created beamforming vectors.

According to yet another aspect of the disclosure, an apparatus for facilitating multi-user joint transmit-receive beamforming facilitating multi-user joint transmit-receive beamforming is provided. The apparatus includes means for receiving detected channel information from a plurality of access terminals; means for selecting a set of access terminals from the plurality of access terminals based on the received channel information; means for creating a beamforming vector for each access terminal in the set of selected access terminals; and means for transmitting a signal using at least one of the created beamforming vectors.

According to yet another aspect of the disclosure, an apparatus for facilitating multi-user joint transmit-receive beamforming is provided. The apparatus includes a receiver configured to receive detected channel information from a plurality of access terminals; and, a processing system. The processing system is configured to select a set of access terminals from the plurality of access terminals based on the received channel information; create a beamforming vector for each access terminal in the set of selected access terminals; and, transmit a signal using at least one of the created beamforming vectors.

According to yet another aspect of the disclosure, a computer-program product for facilitating multi-user joint transmit-receive beamforming is disclosed. The computer-program product includes a machine-readable medium encoded with instructions executable by a processor to cause the processor to receive detected channel information from a plurality of access terminals; select a set of access terminals from the plurality of access terminals based on the received channel information; create a beamforming vector for each access terminal in the set of selected access terminals; and transmit a signal using at least one of the created beamforming vectors.

According to yet another aspect of the disclosure, a base station is disclosed. The base station includes a wireless network adapter configured to receive detected channel information from a plurality of access terminals; and a processing system. The processing system is configured to select a set of access terminals from the plurality of access terminals based on the received channel information; create a beamforming vector for each access terminal in the set of selected access terminals; and transmit a signal using at least one of the created beamforming vectors.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

These and other sample aspects of the disclosure will be described in the detailed description that follow, and in the accompanying drawings, wherein.

Figure 1:
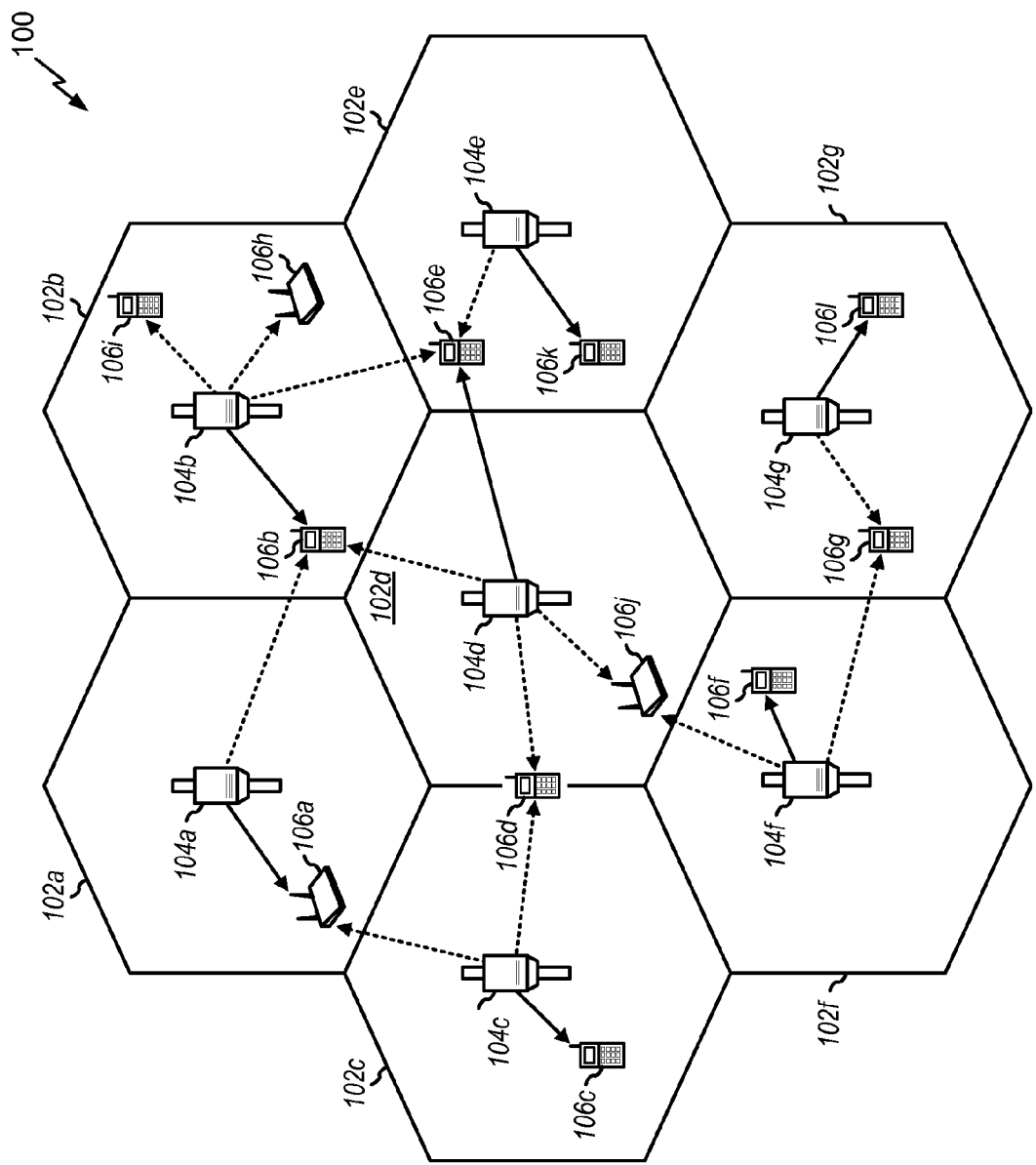
FIG. 1 is a diagram of a wireless communications network configured in accordance with one aspect of the disclosure.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In an aspect of the disclosure, a multi-user terminal MIMO system implements linear joint transmit-receive beamforming for a base station to support a plurality of access terminals, in which each access terminal provides feedback of detected channel information to the base station. The detected channel information is preferably a quantized version of the analyzed channel and includes Channel Direction Information (CDI). Then, the base station selects access terminals based on their channel directions and computes beamforming vectors in a continuous domain using a close-form Minimum Mean Squared Error (MMSE) solution in contrast to an exhaustive search over finite codebooks.

FIG. 1 illustrates an exemplary wireless communication system 100 configured to support a number of user terminals, in which various disclosed aspects may be implemented. As shown in FIG. 1, by way of example, the wireless communication system 100 provides communication for devices in multiple cells 102, such as, for example, macro cells 102a-102g. Each cell is serviced by a corresponding base station (BS), illustrated as BSs 104a-104g, and may be interchangeably referred to as an access point. Each cell may be further divided into one or more sectors. Various access terminals (ATs) 106, illustrated as ATs 106a-106k, also known interchangeably as user terminals, user equipment or mobile stations, are dispersed throughout the system. Each one of ATs 106a-106k may communicate with one or more BSs 104a-104g on a forward link (FL) and/or a reverse link (RL) at a given moment, depending upon whether the particular AT is active and whether it is in soft handoff, for example. The wireless communication system 100 may provide service over a large geographic region. For example, macro cells 102a-102g may cover a few city blocks in a neighborhood.

Figure 2:
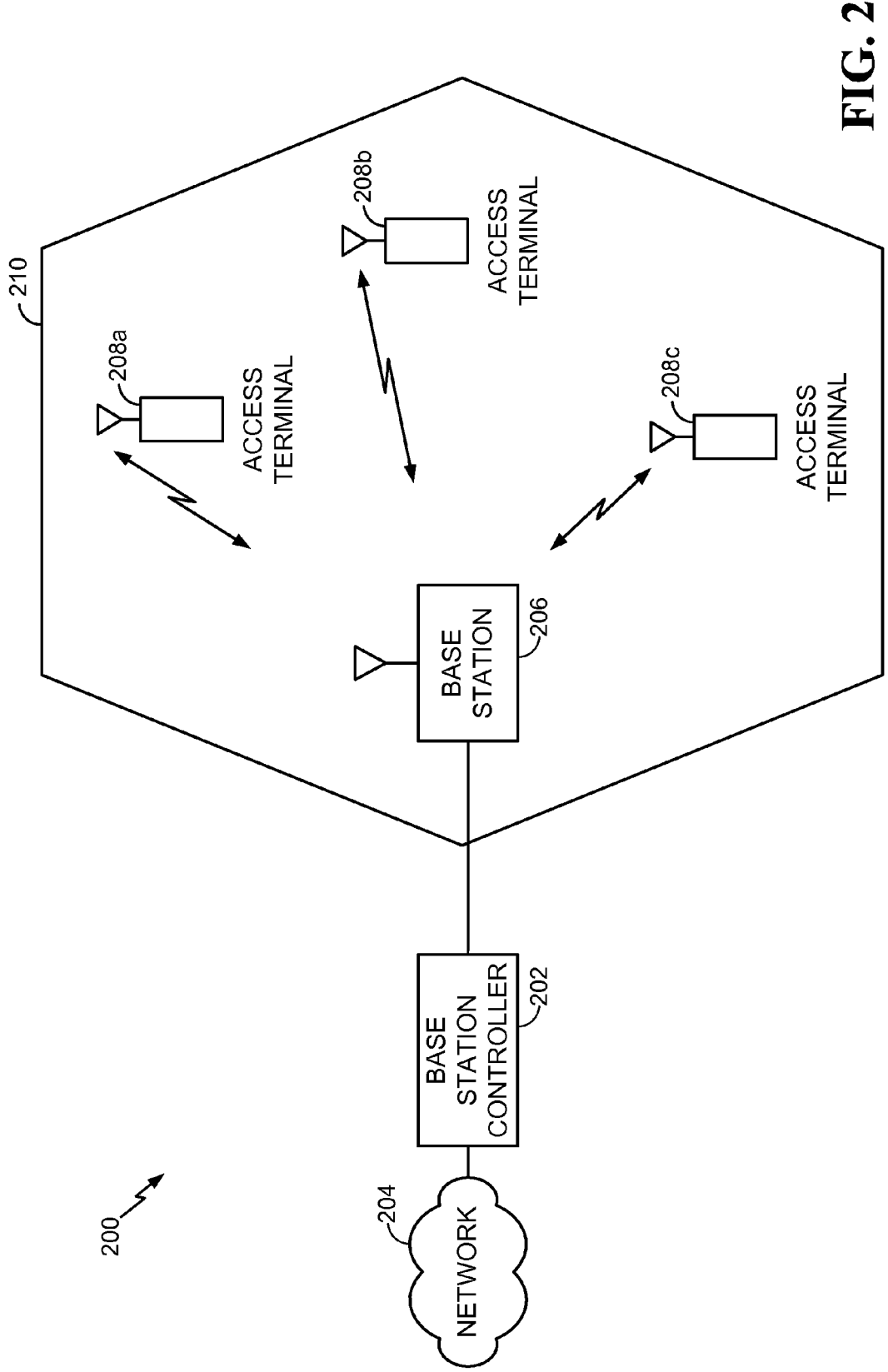
FIG. 2 is a block diagram of a CDMA communications system configured in accordance to one aspect of the disclosure.

FIG. 2 illustrates a communications system 200. As shown in FIG. 2, a base station controller 202 can be used to provide an interface between a network 204 and all base stations dispersed throughout a geographic region. For ease of explanation, only one base station 206 is shown. The geographic region is generally subdivided into smaller regions known as cells. A cell may be divided into multiple sectors. A sector is a physical coverage area within a cell. Base stations within a wireless communication system may utilize antennas that concentrate the flow of power within a particular sector of the cell. Such antennas may be referred to as directional antennas. Cells may also be referred to interchangeably as sectors. Again, for ease of explanation, only one cell 210 is shown.

The base station 206 is configured to serve all access terminals 208 in its respective cell, which in this case is the cell 210. In some high traffic applications, the cell 210 may be further divided into sectors, with a base station serving each sector. In the described aspect, three access terminals 208a-208c are shown in communication with the base station 206. Each access terminal 208a-208c may access the network 204, or communicate with other access terminals 208, through one or base stations 206 under control of the base station controller 202.

Several aspects of the communications system 200 that includes various aspects of multi-user joint beamforming will now be presented with reference to FIG. 2. The wireless network 200 is shown with several wireless nodes, generally designated as the base station 206 and the access terminal 208a-208c. Each wireless node is capable of receiving and/or transmitting. In the detailed description that follows, the term "base station" is used to designate a transmitting node and the term "access terminal" is used to designate a receiving node for forward link/downlink communications, whereas the term "base station" is used to designate a receiving node and the term "access terminal" is used to designate a transmitting node for reverse link/uplink communications. However, those skilled in the art will readily understand that other terminology or nomenclature may be used for an access point and/or access terminal. By way of example, a base station may be referred to as an access point, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The communications system 200 may support MIMO technology. Using MIMO technology, the base station 206 may communicate with multiple access terminals 208a-208c simultaneously using SDMA. SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enable each of the multiple access terminals 208a-208c to recover the data stream destined for that access terminal. On the uplink, each access terminal transmits a spatially precoded data stream, which enables the base station 206 to identify the source of each spatially precoded data stream.

One or more of the multiple access terminals 208a-208c may be equipped with multiple antennas to enable certain functionality. With this configuration, multiple antennas at the base station 206 may be used to communicate with a multiple antenna base station to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support Multiple In, Multiple Out (MIMO) technology, the base station 206 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), Frequency Division Multiple Access (FDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

The wireless node, whether an base station or access terminal, may be implemented with a protocol that utilizes a layered structure that includes a physical (PHY) layer that implements all the physical and electrical specifications to interface the wireless node to the shared wireless channel, a MAC layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between a base station and access terminal, or two access terminals, and therefore, may not require an application layer. Those skilled in the art will be readily able to implement the appropriate protocol for any wireless node depending on the particular application and the overall design constraints imposed on the overall system.

When the wireless node in a transmit mode, the application layer processes data, segments the data into packets, and provides the data packets to the MAC layer. The MAC layer assembles MAC packets with each data packet from the application layer being carried by the payload of a MAC packet. Alternatively, the payload for a MAC packet may carry a fragment of a data packet or multiple data packets from the application layer. Each MAC packet includes a MAC header and an error detection code. The MAC packet is sometimes referred to as a MAC Protocol Data Unit (MPDU), but may also be referred to as a frame, packet, timeslot, segment, or any other suitable nomenclature.

When the MAC decides to transmit, it provides a block of MAC packets to the PHY layer. The PHY layer assembles a PHY packet by assembling the block of MAC packets into a payload and adding a preamble. As will be discussed in greater detail later, the PHY layer is also responsible for providing various signal processing functions (e.g., modulating, coding, spatial processing, etc.). The preamble, which is sometimes referred to as Physical Layer Convergence Protocol (PLCP), is used by the receiving node to detect the start of the PHY packet and synchronize to the transmitter's node data clock. The PHY packet is sometimes referred to as a Physical Layer Protocol Data Unit (PLPDU), but may also be referred to as a frame, packet, timeslot, segment, or any other suitable nomenclature.

When the wireless node is in a receive mode, the process is reversed. That is, the PHY layer detects an incoming PHY packet from the wireless channel. The preamble allows the PHY layer to lock in on the PHY packet and perform various signal processing functions (e.g., demodulating, decoding, spatial processing, etc.). Once processed, the PHY layer recovers the block of MAC packets carried in the payload of the PHY packet and provides the MAC packets to the MAC layer.

Figure 3:
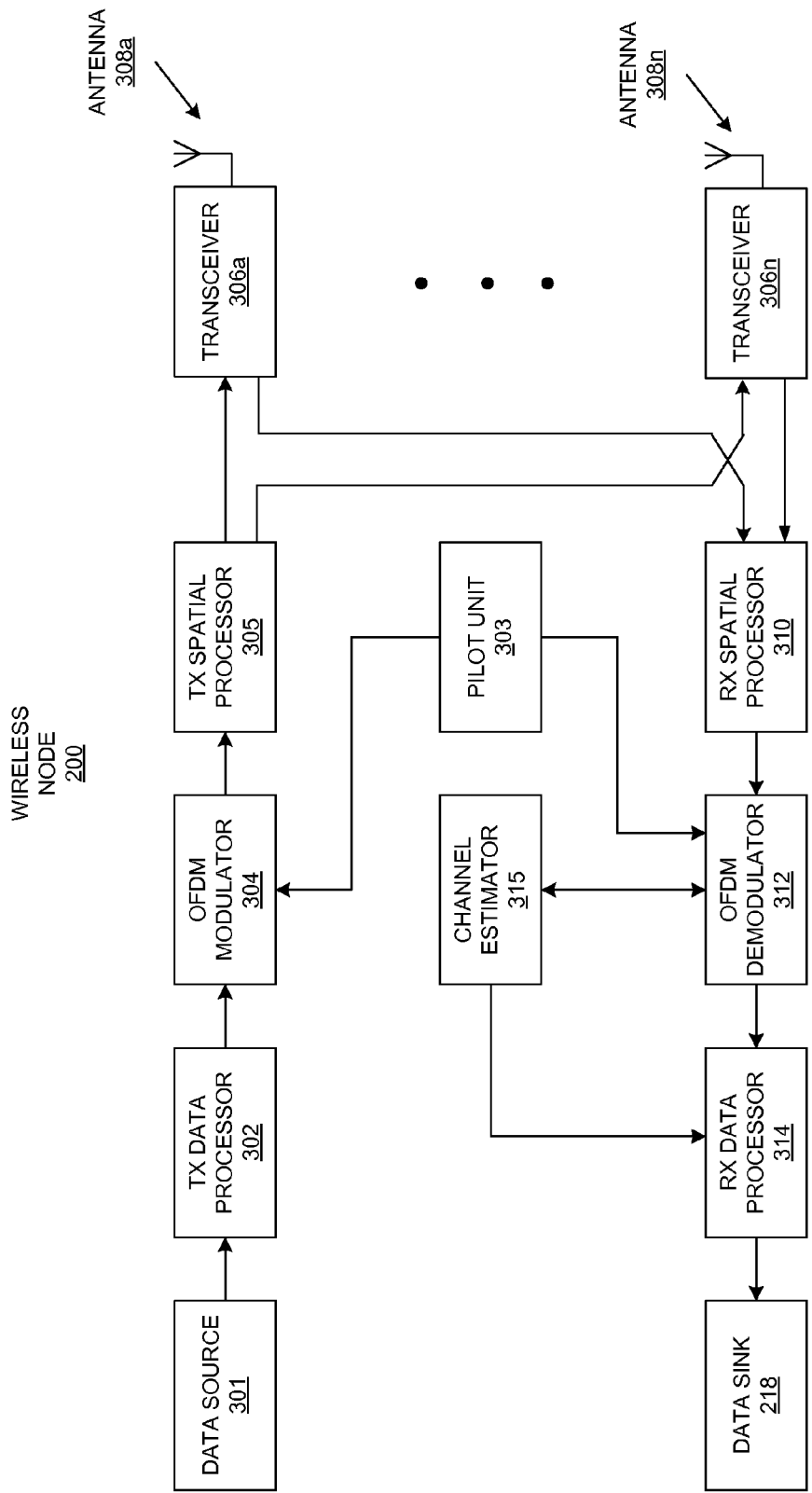
FIG. 3 is a block diagram of an example of signal processing functions of a Physical (PHY) layer of a wireless node in the wireless communications network of FIG. 1.

FIG. 3 is illustrates a wireless node 300 configured in accordance with the various aspects of the disclosure contained herein that is usable in the wireless network 100. In a transmit mode, a transmit (TX) data processor 302 may be used to receive data from a data source 301 and encode the data to facilitate Forward Error Correction (FEC) at the receiving node. An example of an encoding scheme usable in the TX data processor 302 is a turbo code encoding scheme. The encoding process results in a sequence of code symbols that may be blocked together and mapped to a signal constellation by the TX data processor 302 to produce a sequence of modulation symbols.

In wireless nodes implementing OFDM, the modulation symbols from the TX data processor 302 may be provided to an OFDM modulator 304. The OFDM modulator 304 splits the modulation symbols into a number of parallel streams and then maps each stream to a subcarrier using some modulation constellation. An Inverse Fast Fourier Transform (IFFT) is then performed on each set of subcarriers to produce time domain OFDM symbols, with each OFDM symbol having a set of subcarriers. The OFDM symbols are distributed in the payloads of multiple data packets.

In at least one configuration of the wireless node 300, at least one pilot signal is carried along with the payload in each data packet. A pilot is typically a non-data-bearing spread spectrum signal generated by a pilot unit 303, employed to enable a receiver to acquire the timing of one or more associated data-bearing (traffic) signal channels, and to provide a phase reference for coherent demodulation of such associated traffic channels. The OFDM modulator 304 splits the pilot signals into a number of parallel streams, and then maps each stream to a subcarrier using some modulation constellation. An IFFT is then performed on each set of subcarriers to produce one or more time domain OFDM symbols which constitutes the pilot signals. The pilot signals are then appended to payload carried by each data packet before providing the data packets to a TX spatial processor 305.

The TX spatial processor 305 performs spatial processing on the data packets. This may be accomplished by spatially preceding the data packets into a number of spatially precoded streams and then providing each spatially precoded stream to a different antenna in a plurality of antennas 308a-308n via a respective one of a plurality of transceivers 306a-306n. Each transceiver modulates an RF carrier with a respective precoded stream for transmission over the wireless channel.

In a receive mode, each one of a plurality of transceivers 306a-306n receives a signal through its respective antenna. Each transceiver may be used to recover the information modulated onto an RF carrier and provide the information to an RX spatial processor 310 to perform spatial processing on the information to recover data packets carried on any spatial streams destined for the wireless node 300. The spatial processing may be performed in accordance with Channel Correlation Matrix Inversion (CCMI), Minimum Mean Square Error (MMSE), Soft Interference Cancellation (SIC), or other suitable techniques.

An OFDM demodulator 312 recovers the data carried on each subcarrier in the OFDM symbols in the payload of the data packet and multiplexes the data into a stream of modulation symbols, including pilot signals. The OFDM demodulator 312 converts the stream from a time-domain to a frequency domain using a Fast Fourier Transfer (FFT). The frequency domain signal includes a separate stream for each subcarrier.

A channel estimator 315 receives the streams that contain the pilot signals from the OFDM demodulator 312 and estimates a channel response. Each pilot signal will be generally shifted in phase due to the transmission through the wireless channel. The MMSE estimates of the phase-shifted pilot signals are computed and these estimates are used to estimate phase errors and consequently the channel response. The channel response is provided to an RX data processor 314.

The RX data processor 314 is used to translate each modulation symbols back to a correct point in the signal constellation. Because of noise and other disturbances in the wireless channel, the modulation symbols may not correspond to an exact location of a point in the original signal constellation. Using the channel response, the RX data processor 314 detects which modulation symbol was most likely transmitted by finding the smallest distance between the received point and the location of a valid symbol in the signal constellation. These soft decisions may be used, in the case of turbo codes, for example, to compute a Log-Likelihood Ratio (LLR) of the code symbols associated with the given modulation symbols. The RX data processor 314 then uses the sequence of code symbol LLRs and the phase error estimates in order to decode the data that was originally transmitted before providing the data to a data sink 318.

The disclosure proposes a distributed beamforming method for maximization of utility across a wireless cellular network. The present disclosure proposes a scheme that selects beams that maximize the ratio of signal power to the noise plus interference caused by the beams in question in the sectors in the active set or adjacent sectors. In accordance with this scheme, the beam selection may be done at the base station instead of the mobile station. Using additional Channel State Information (CSI), the base station may avoid causing interference in adjacent sectors and may considerably improve the performance of the system.

The techniques described herein may be applied in a system in which there exists K access terminals in one sector. It may be assumed that the number of transmit antennas at the base station is M and the number of receive antennas at each AT is N. Further, it may be assumed that during each slot, only a subset of the ATs is selected for transmission and each AT is served by only one data stream. The number of selected ATs, S is constrained so that $S \leq M$.

The received signal vector of the k-th selected access terminal can be represented as:

$$(y_k)_{N \times 1} = (H_k)_{N \times M}(x)_{M \times 1} + (n_k)_{N \times 1},$$
$$k = 1, \ldots, S$$

$$(x)_{M \times 1} = \sum_{k=1}^{S} (w_k)_{M \times 1}(d_k)_{1 \times 1}.$$

Here, $H_k$ denotes the channel response matrix from the basestation to access terminal k and $w_k$ represents the transmit filter, i.e., the precoder for access terminal k.

After applying receive filter $u_k$:

$$r_k = u_k^H \left( H_k w_k \sqrt{P s_k} + \sum_{j \neq k} H_k w_j \sqrt{P s_j} + n_k \right)$$

$$SINR_k = \frac{|u_k^H H_k w_k|^2 P}{\sum_{j \neq k} |u_k^H H_k w_j|^2 P + u_k^H u_k N_k}.$$

It is difficult to obtain a close-form solution of the joint optimal transmit and receive filter vectors for the S selected users that maximizes the sum rate.

In one aspect of the disclosure, a practical yet effective joint transmit-receive beamforming scheme attempts to break down the transmission strategy into two parts: the beamformer on the receive portion attempts to maximize the receive energy of the target access terminal by matching to the dominant eigenvector of the channel; the beam former on the transmit potion attempts to provide spatial nulling capability so as to minimize the interference caused to other selected access terminals.

In a situation where there is perfect Channel State Information at the Transmitter (CSIT), the first part concerning the beam former on the receive portion can be achieved through a singular-value decomposition (SVD) of the channel matrix:

$$(H_k)_{N \times M} = (U_k)_{N \times N} (\Sigma_k)_{N \times M} (V_k^H)_{M \times M}$$

$$= [u_{k,1}, \ldots, u_{k,N}]$$

$$\begin{bmatrix} \lambda_{k,1} & 0 \ldots & 0 & 0 & \ldots & 0 \\ 0 & \lambda_{k,n} & 0 & \ldots & \ldots & \ldots \\ 0 \ldots & 0 & \lambda_{k,N} & 0 & \ldots & 0 \end{bmatrix} \begin{bmatrix} v_{k,1}^H \\ \ldots \\ v_{k,M}^H \end{bmatrix},$$

$$= [u_{k,1}, \ldots, u_{k,N}] \begin{bmatrix} \lambda_{k,1} \cdot v_{k,1}^H \\ \ldots \\ \lambda_{k,N} \cdot v_{k,N}^H \end{bmatrix},$$

If the receive filter $u_{k,1}$ which is applied is the dominant left eigenvector of the channel matrix, then the output of the receive filter, $(r_k)_{1 \times 1}$, is given by:

$$(r_k)_{1 \times 1} = (u_{k,1}^H)_{1 \times N} ((H_k)_{N \times M} (x)_{M \times 1} + (n_k)_{N \times 1})$$

$$= (u_{k,1}^H) [u_{k,1}, \ldots, u_{k,N}] \begin{bmatrix} \lambda_{k,1} \cdot v_{k,1}^H \\ \ldots \\ \lambda_{k,N} \cdot v_{k,M}^H \end{bmatrix} \sum_{j=1}^{S} w_j d_j + n_k,$$

$$= (\lambda_{k,1} \cdot v_{k,1}^H) \sum_{j=1}^{S} w_j d_j + z_k.$$

Essentially, the product of dominant right eigenvector and eigenvalue, $\lambda_{k,1} \cdot v_{k,1}^H$ becomes the equivalent channel from the base station to access terminal k when $u_{k,1}$ is the dominant left eigenvector.

In an aspect of the disclosure, for the optimization of the beam former on the transmit portion, a metric is introduced which is referred to as the Signal to Caused Interference plus Noise Ratio (SCINR). This metric attempts to achieve a balance between maximizing the power gain for the target access terminal and minimizing the potential interference created to other access terminals.

$$SCINR_k = \frac{|u_k^H H_k w_k|^2 P}{\sum_{j \neq k} |u_j^H H_j w_k|^2 P + N_k}.$$

Once the receive filters are known or assumed at the transmitter, which in an aspect can be dominant left eigenvectors of the channels or other vectors, the solution to this optimizating the SCINR is equivalent to the MMSE solution of the virtual uplink beamforming problem where the S access terminals transmitting to base station k with equivalent noise variance $N_k$. That is, the transmit filter is given by:

$$w_k^{opt} = \left( N_k I + P \sum_{j \neq k} (H_j^H u_j)(H_j^H u_j)^H \right)^{-1} (H_k^H u_k).$$

By applying a MMSE function instead of a ZF transmit filter, the power loss can be minimized even with limitations in access terminal selection algorithms. In an aspect of the disclosure, instead of solving for the transmit filter $w_k$ in closed form, one can also select it from a pre-defined codebook to maximize the SCINR as defined earlier.

The transmit and receive filter approaches discussed above assumes perfect CSI. However, due to channel variations and/or channel estimation errors, generally by the time the access terminal receives the signals, the channel observed by the receiver could be different from the one assumed by the transmitter. Therefore, instead of matching to the dominant eigenvector, the receiver can apply the MMSE filter to null out the residual interference due to channel mismatch. In particular, since only one stream is served per access terminal, the receive antenna array can use the remaining N-1 antennas for interference suppression purposes.

In essence, if the received signals can be rewritten as $$y_k = H_k x + n_k$$

$$= H_k w_k d_k + H_k \sum_{j=1, j \neq k}^{S} w_j d_j + n_k,$$

then instead of applying the MF filter to the dominant eigenmode, we can use a receive filter based on the MMSE criterion:

$$u_{mmse} = \left( \sigma^2 I + H_k \left( \sum_{j=1, j \neq k}^{S} w_j w_j^H \right) H_k^H \right)^{-1} (H_k w_k),$$

and the resulting SINR is given by:

$$\gamma_k = (H_k w_k)^H \left( \sigma^2 I + H_k \left( \sum_{j=1, j \neq k}^{S} w_j w_j^H \right) H_k^H \right)^{-1} (H_k w_k).$$

The implementation for calculating $u_{mmse}$ should be straightforward for those skilled in the art, based on either the explicit channel and beamformer information or from direct estimation of $R_{yy,k}$.

Since the transit filter assumes that the receive filter is fixed, the access terminal does not need to feedback the channel matrix of dimension N×M. Instead, access terminal k only needs to feedback the equivalent channel vector of dimension 1×M, in the form of $u_k^H H_k$. In the case where the receive filter is the dominant left eigenvector, the equivalent channel vector becomes essentially the dominant right eigenvector.

Figure 4:
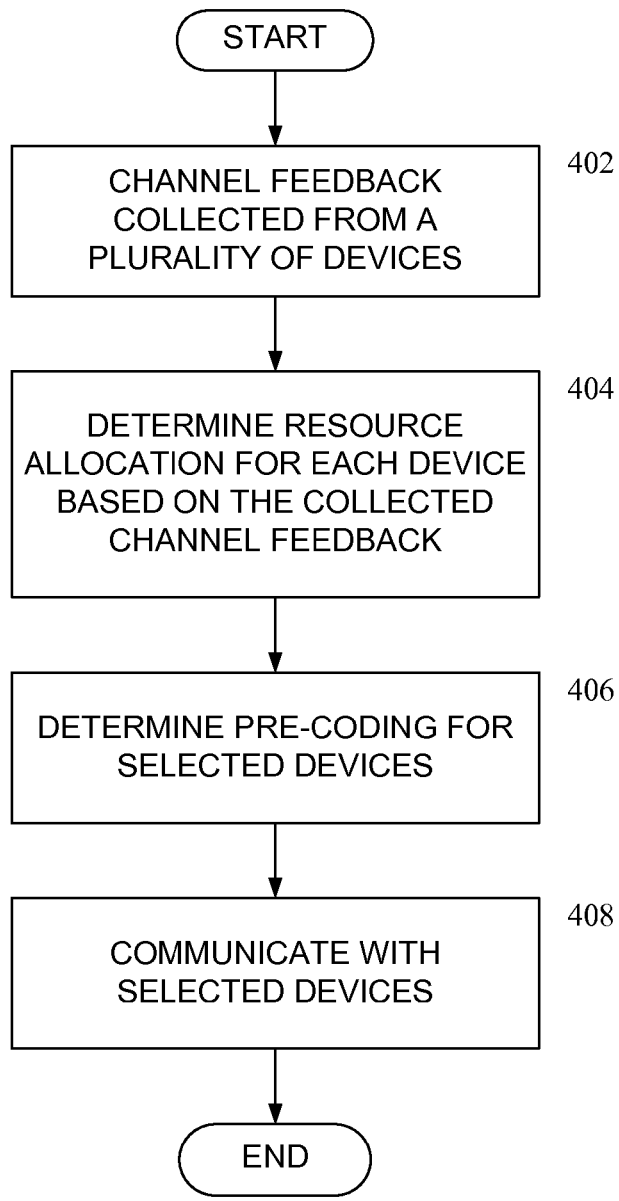
FIG. 4 is a flow diagram of a multi-user joint beamforming process that is used in the wireless communications network of FIG. 1.
Figure 5:
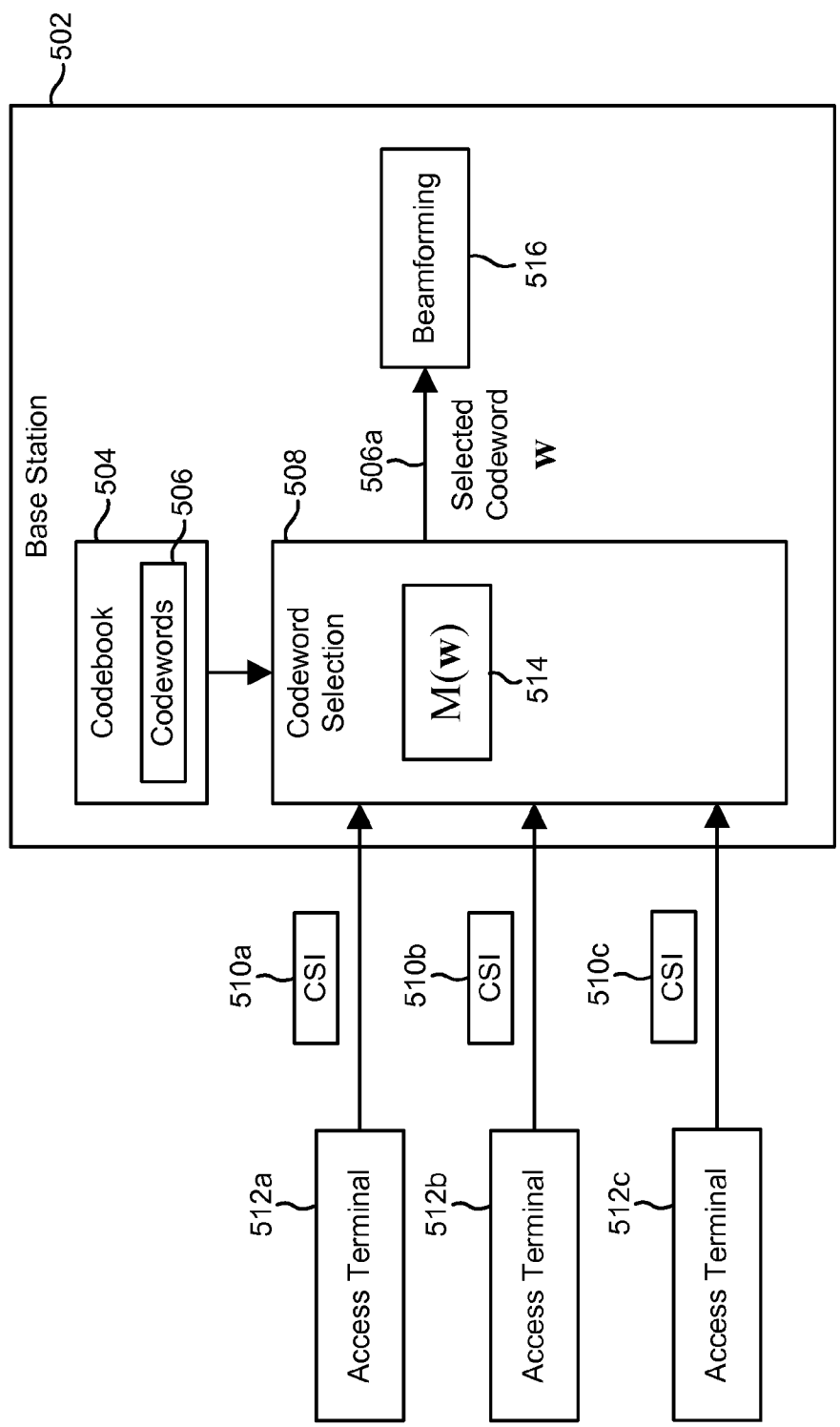
FIG. 5 is a block diagram illustrating an example of CSI that may be fed back from an access terminal to a base station.

FIG. 4 illustrates a process 400 for facilitating multi-user joint beamforming having a step 402 where channel feedback is collected from a plurality of devices, such as access terminals from a base station. In accordance with various aspects of the disclosure, the access terminals may send back downlink channel information to the base station. Specifically, the base station may receive Channel State Information (CSI) fed back from its access terminals. Referring to FIG. 5, a base station 502 is shown receiving CSI 510a-510c from one or more access terminals 512a-512c. The base station 502 may maximize a utility function M(w) 514 and choose a codeword 506 that maximizes the signal to caused interference plus noise ratio. A codeword selection component 508 is shown in FIG. 5 for providing this functionality. Once a particular codeword 506a (i.e., beamforming vector w) has been selected, the selected codeword 506a may be used for beamforming. A beamforming component 516 is illustrated for providing this functionality.

Different levels of feedback of CSI are possible. Some examples of the different levels of feedback will now be discussed. Feeding back full CSI may be practical when the fading is slow and only the changes (innovations) in the channel value are fed back. When it is not possible to feed back all the channel information to the base station in the active set, quantized direction plus amplitude can serve as a replacement for the full feedback. In this case, each of the users may feedback a quantized version of the channel (this quantized version may be an element in the fixed codebook) plus the amplitude of the channel to the base station.

Figure 6:
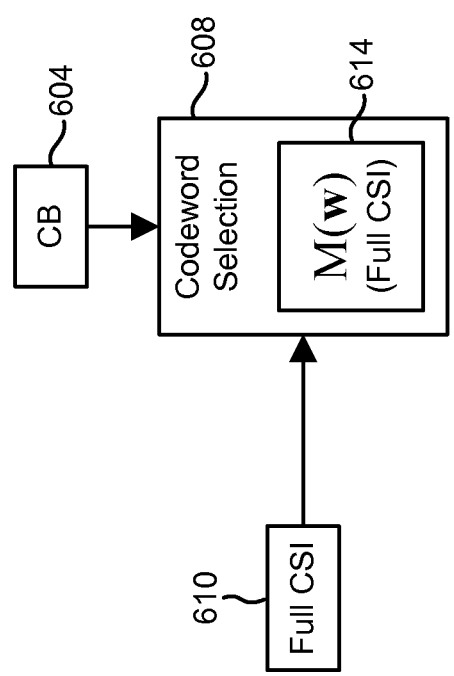
FIG. 6 is a block diagram illustrating an example CSI that may be fed back from an access terminal to a base station.
Figure 7:
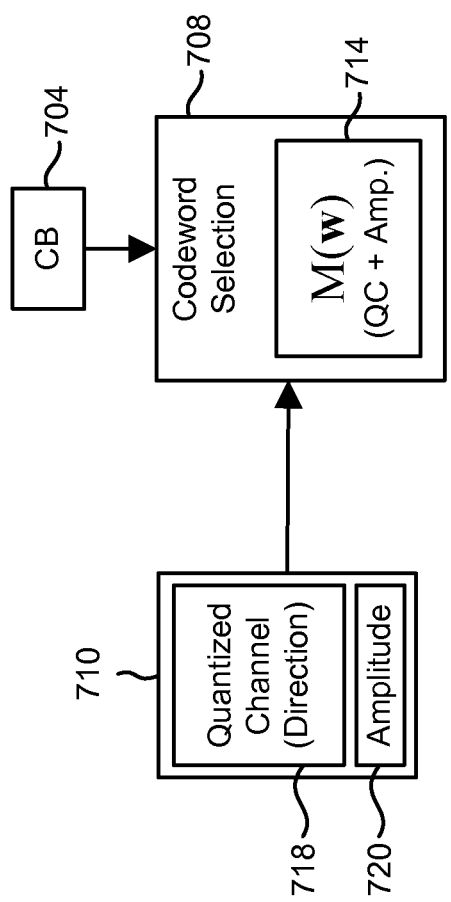
FIG. 7 is a block diagram illustrating another example of CSI that may be fed back from an access terminal to a base station.
Figure 8:
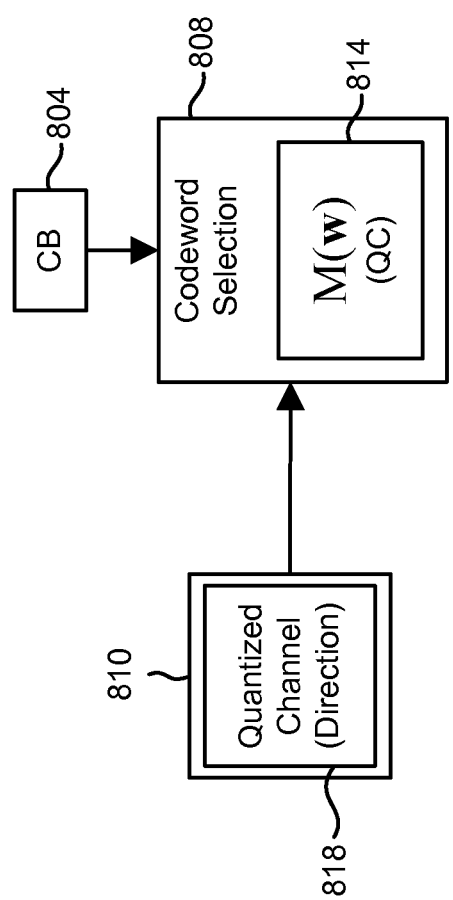
FIG. 8 is a block diagram illustrating yet another example of CSI that may be fed back from an access terminal to a base station.

Different levels of channel state information feedback are illustrated in FIGS. 6 through 8. Referring to FIG. 6, when full CSI 610 is fed back from access terminals, a codeword selection component 608 may select a codeword from a codebook 604 by maximizing a utility function 614 such as the one provided above. Referring to FIG. 7, when the channel state information 710 fed back from users only includes a quantized version of the channel direction 718 and the amplitude 720 of the channel, a codeword selection component 708 may select a codeword from a codebook 704 by maximizing a utility function M(w) 714 such as the one provided herein. Referring to FIG. 8, when the channel state information 810 fed back from users only includes a quantized version of the channel direction 818, a codeword selection component 808 may select a codeword from a codebook 804 by maximizing a utility function M(w) 814.

Based on the collected channel feedback, in step 404, resource allocation for each device is determined for each device. In various aspects of the disclosure, the resource allocation can include the allocation of a resource block, such as under an OFDM system; a time slot, such as in a TDMA system; a frequency, such as in a FDMA system; or a code, such in a CDMA system. The resources may be provided simultaneously to a number of access terminals, and up to a specified number of access terminals may be served in this manner. Thus, as part of the resource allocation set, a set of access terminals that will be served will be determined. In the transmit filter design discussed above, the approach is to apply spatial nulling at the transmit side. It can be shown that if the channel directions of the selected access terminals have strong correlations, it will result in significant transmit power penalty. Therefore, it is important to select the access terminals to be served carefully to minimize the transmit power loss.

One effective approach of access terminal selection is to select S≦M access terminals, where the CDI's of the equivalent channel vectors, such as dominant right eigenvectors, of the access terminals have small correlations. In one aspect of the disclosure, the access terminal selection starts from finding the access terminal with the highest equivalent channel norm; then adds one additional access terminal at a time that: 1) is among a sub-set of access terminals whose CDI's have small correlation relative to those of the selected access terminals; and 2) has the highest channel norm. Access terminals are added until S=M or no more access terminals can be added to satisfy the small correlation rule. It should be noted that if the access terminal with the highest channel norm is chosen initially, there may not be enough compatible access terminals found in terms of channel directions. Thus, in another aspect of the disclosure, another access terminal may be used as a starting point that may result in more compatible access terminals to be selected to fully utilize the spatial degree of freedoms. In either case, selecting access terminals with large path-loss differential to be served together should be avoided since weak access terminals can suffer from performance due to residual interference from the strong access terminals.

In step 406, precoding is performed on the set of selected access terminals. In one aspect of the disclosure, the precoding is performed using the transmit filter as described herein. The preceding is performed based on the users that are selected.

In step 408, the base station communicates with the selected access terminals using the beamforming vectors that have been selected previously.

Figure 9:
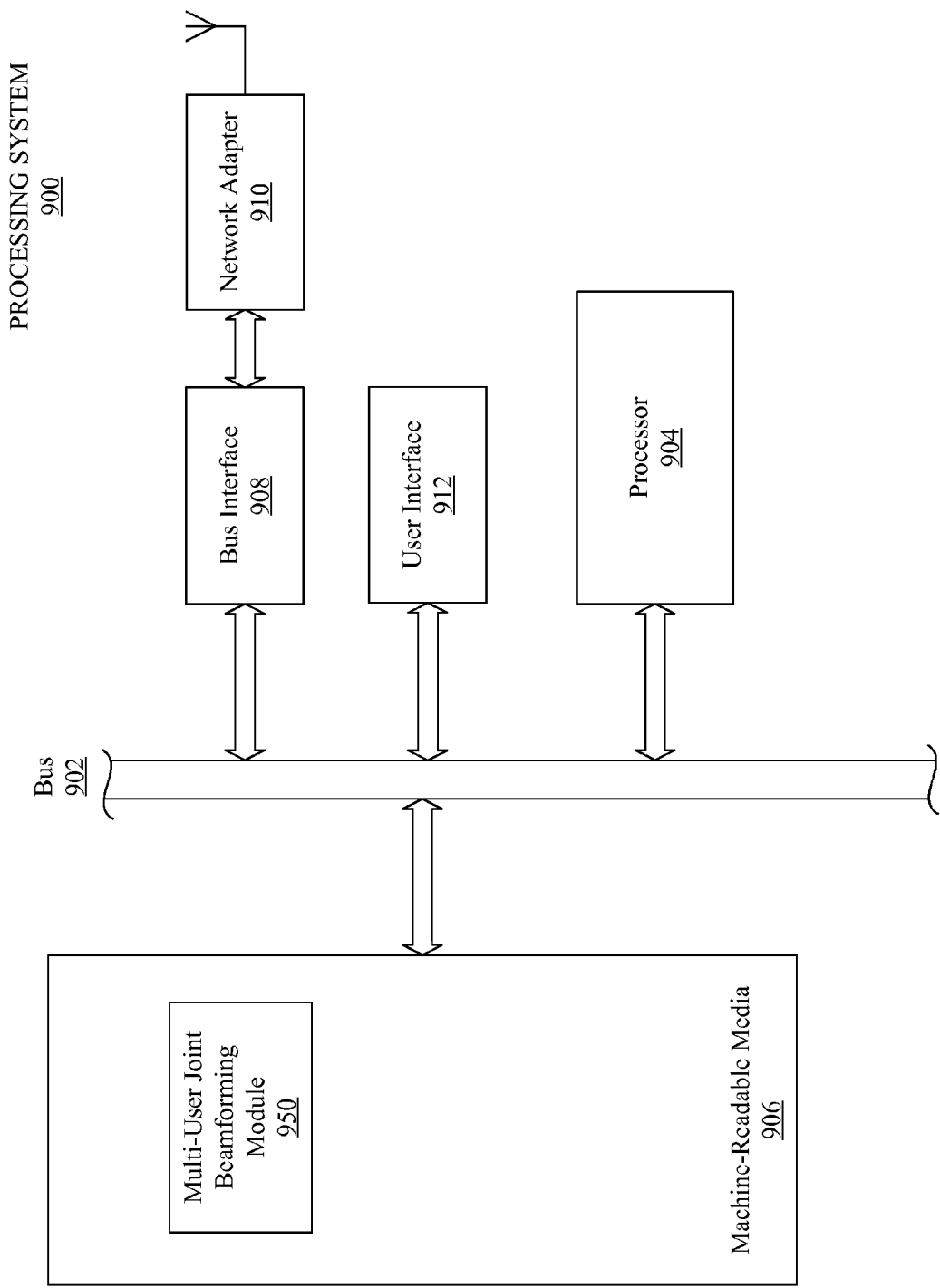
FIG. 9 is a block diagram illustrating an example of a hardware configuration for a processing system in a wireless node in the wireless communications network of FIG. 1; and, FIG. 10 is a block diagram of a communication apparatus configured in accordance with an aspect of the disclosure.

FIG. 9 is a conceptual diagram illustrating an example of a hardware configuration for a processing system in a wireless node. In this example, the processing system 900 may be implemented with a bus architecture represented generally by bus 902. The bus 902 may include any number of interconnecting buses and bridges depending on the specific application of the processing system 900 and the overall design constraints. The bus links together various circuits including a processor 904, machine-readable media 906, and a bus interface 908. The bus interface 908 may be used to connect a network adapter 910, among other things, to the processing system 900 via the bus 902. The network interface 910 may be used to implement the signal processing functions of the PHY layer. In the case of an access terminal 210 (see FIG. 2), a user interface 912 (e.g., keypad, display, mouse, joystick, etc.) may also be connected to the bus 902. The bus 902 may also link various other circuits such as timing sources, peripherals, voltage regulators, power management circuits, and the like, which are well known in the art, and therefore, will not be described any further.

The processor 904 is responsible for managing the bus and general processing, including the execution of software stored on the machine-readable media 906. The processor 908 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable may be embodied in a computer-program product. The computer-program product may comprise packaging materials.

In the hardware implementation illustrated in FIG. 9, the machine-readable media 906 is shown as part of the processing system 900 separate from the processor 904. However, as those skilled in the art will readily appreciate, the machine-readable media 906, or any portion thereof, may be external to the processing system 900. By way of example, the machine-readable media 906 may include a transmission line, a carrier wave modulated by data, and/or a computer product separate from the wireless node, all which may be accessed by the processor 904 through the bus interface 908. Alternatively, or in addition to, the machine readable media 906, or any portion thereof, may be integrated into the processor 904, such as the case may be with cache and/or general register files.

The processing system 900 may be configured as a general-purpose processing system with one or more microprocessors providing the processor functionality and external memory providing at least a portion of the machine-readable media 906, all linked together with other supporting circuitry through an external bus architecture. Alternatively, the processing system 900 may be implemented with an ASIC (Application Specific Integrated Circuit) with the processor 904, the bus interface 908, the user interface 912 in the case of an access terminal), supporting circuitry (not shown), and at least a portion of the machine-readable media 906 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 900 depending on the particular application and the overall design constraints imposed on the overall system.

Figure 10:
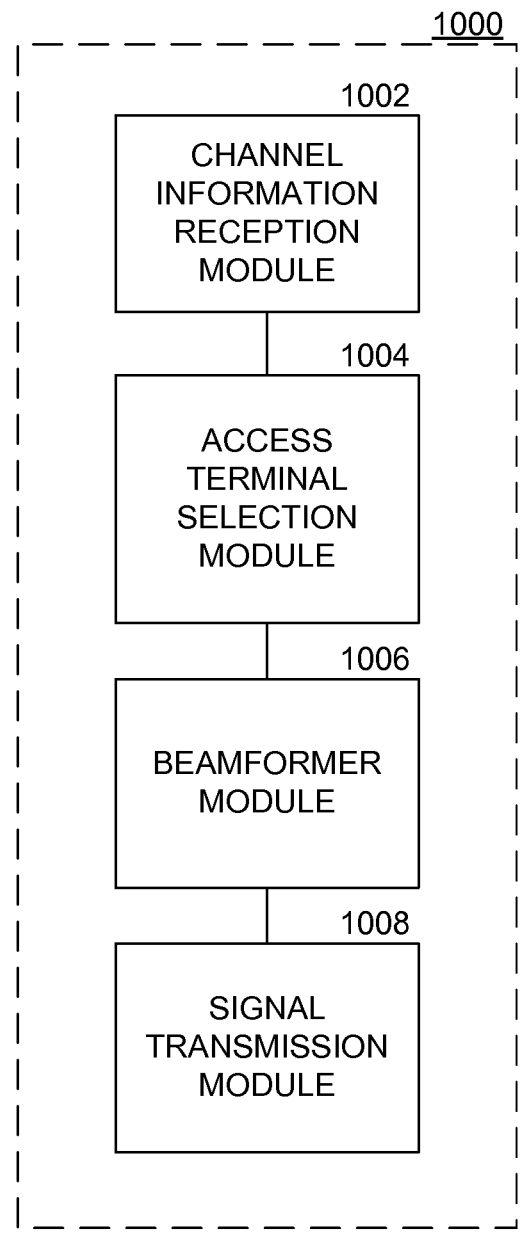

The machine-readable media 906 is shown with a number of software modules. The software modules include instructions that when executed by the processor 904 cause the processing system 900 to perform various functions. Each software module may reside in a single storage device or distributed across multiple storage devices. By way of example, a software module may be loaded into RAM from a hard drive when a triggering event occurs. During execution of the software module, the processor 904 may load some of the instructions into cache to increase access speed. One or more cache lines may then be loaded into a general register file for execution by the processor 904. When referring to the functionality of a software module below, it will be understood that such functionality is implemented by the processor 904 when executing instructions from that software module. In one aspect, a module 950 for facilitating a multi-user joint beamforming system is provided FIG. 10 is a block diagram illustrating an example of the functionality of an apparatus for communication 1000 according to another aspect of the disclosure. The apparatus for communication 1000 includes a channel information reception module 1002 for receiving channel information from a plurality of access terminals; an access terminal selection module 1004 for selecting a set of access terminals from the plurality of access terminals; a beamformer module 1006 for creating a beamforming vector for each access terminal in the set of selected access terminals; and a signal transmission module 1008 for transmitting a signal using at least one of the created beamforming vectors.

This proposed methods and system balances a tradeoff between maximizing energy transmitted to a target access terminal verse minimizing interference caused to other access terminals. In addition, for a common scenario where the base stations have small angular spreads, even though the amplitude information of the channel may vary quickly over time, the CDI tends to change much more slowly. In linear beamforming, accurate CDI knowledge is sufficient for effective spatial nulling. Access terminal selection is based on CDI so that the performance of the scheme can be robust to channel mismatch.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

The disclosure is not intended to be limited to the preferred aspects. Furthermore, those skilled in the art should recognize that the method and apparatus aspects described herein may be implemented in a variety of ways, including implementations in hardware, software, firmware, or various combinations thereof Examples of such hardware may include ASICs, Field Programmable Gate Arrays, general-purpose processors, DSPs, and/or other circuitry. Software and/or firmware implementations of the disclosure may be implemented via any combination of programming languages, including Java, C, C++, Matlab™, Verilog, VHDL, and/or processor specific machine and assembly languages.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or a base station. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method and system aspects described herein merely illustrate particular aspects of the disclosure. It should be appreciated that those skilled in the art will be able to devise various arrangements, which, although not explicitly described or shown herein, embody the principles of the disclosure and are included within its scope. Furthermore, all examples and conditional language recited herein are intended to be only for pedagogical purposes to aid the reader in understanding the principles of the disclosure. This disclosure and its associated references are to be construed as being without limitation to such specifically recited examples and conditions. Moreover, all statements herein reciting principles, aspects, and aspects of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the disclosure. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

It is understood that any specific order or hierarchy of steps described in the context of a software module is being presented to provide an examples of a wireless node. Based upon design preferences, it is understood that the specific order or hierarchy of steps may be rearranged while remaining within the scope of the disclosure.

Although various aspects of the disclosure have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication comprising:
   receiving channel direction information (CDI) from a plurality of access terminals;
   selecting a set of access terminals from the plurality of access terminals based on the received CDI, wherein selecting the set comprises, while a number of access terminals in the set is fewer than a number of transmit antennas:
      identifying an access terminal that has a highest channel norm of a subset of unselected access terminals, wherein the CDI of each of the access terminals in the subset has a low correlation with respect to the CDI of access terminals in the set; and
      including the identified access terminal in the set;
   creating a beamforming vector for each access terminal in the set of access terminals; and
   transmitting a signal to each access terminal in the set using the created beamforming vectors.

2. The method of claim 1, wherein the CDI is based on a quantized version of a channel.

3. The method of claim 1, wherein the creation of the beamforming vector is based on the CDI of each access terminal in the set of access terminals.

4. The method of claim 1, further comprising computing the beamforming vectors in a continuous domain.

5. The method of claim 1, further comprising computing beamforming vectors using a Minimum Mean Squared Error (MMSE) function.

6. An apparatus for wireless communication comprising:
   means for receiving channel direction information (CDI) from a plurality of access terminals;
   means for selecting a set of access terminals from the plurality of access terminals based on the received CDI, wherein the means for selecting is configured, while a number of access terminals in the set is fewer than a number of transmit antennas, to identify an access terminal that has a highest channel norm of a subset of unselected access terminals and to include the identified access terminal in the set, wherein the CDI of each of the access terminals in the subset has a low correlation with respect to the CDI of access terminals in the set;
   means for creating a beamforming vector for each access terminal in the set of access terminals; and
   means for transmitting a signal to each access terminal in the set using the created beamforming vectors.

7. The apparatus of claim 6, wherein the CDI is based on a quantized version of a channel.

8. The apparatus of claim 6, wherein the means for creating comprises means for creating the beamforming vector based on the CDI of each access terminal in the set of access terminals.

9. The apparatus of claim 6, wherein the means for creating the beamforming vector comprises means for creating the beamforming vector in a continuous domain.

10. The apparatus of claim 6, wherein the means for creating the beamforming vector comprises means for computing the beamforming vector using a Minimum Mean Squared Error (MMSE) function.

11. An apparatus for wireless communication, comprising:
a receiver configured to receive channel direction information (CDI) from a plurality of access terminals; and,
a processing system configured to:
select a set of access terminals from the plurality of access terminals based on the received CDI, wherein selecting the set comprises, while a number of access terminals in the set is fewer than a number of transmit antennas:
identifying an access terminal that has a highest channel norm of a subset of unselected access terminals, wherein the CDI of each of the access terminals in the subset has a low correlation with respect to the CDI of access terminals in the set; and
including the identified access terminal in the set;
create a beamforming vector for each access terminal in the set of access terminals; and
transmit a signal to each access terminal in the set using the created beamforming vectors.

12. The apparatus of claim 11, wherein the CDI is based on a quantized version of the channel.

13. The apparatus of claim 11, wherein the processing system is further configured to create the beamforming vector for each access terminal based on the CDI of each access terminal in the set of access terminals.

14. The apparatus of claim 11, wherein the processing system is further configured to create the beamforming vectors in a continuous domain.

15. The apparatus of claim 11, wherein the processing system is further configured to create the beamforming vectors using a Minimum Mean Squared Error (MMSE) function.

16. A computer-program product, comprising:
a machine-readable medium encoded with instructions executable by a processor to cause the processor to:
receive channel direction information (CDI) from a plurality of access terminals;
select a set of access terminals from the plurality of access terminals based on the received CDI, wherein selecting the set comprises, while a number of access terminals in the set is fewer than a number of transmit antennas:
identifying an access terminal that has a highest channel norm of a subset of unselected access terminals, wherein the CDI of each of the access terminals in the subset has a low correlation with respect to the CDI of access terminals in the set; and
including the identified access terminal in the set;
create a beamforming vector for each access terminal in the set of access terminals; and
transmit a signal to each access terminal in the set using the created beamforming vectors.

17. A base station, comprising:
a wireless network adapter configured to receive channel direction information (CDI) from a plurality of access terminals; and
a processing system configured to:
select a set of access terminals from the plurality of access terminals based on the received CDI, wherein selecting the set comprises, while a number of access terminals in the set is fewer than a number of transmit antennas:
identifying an access terminal that has a highest channel norm of a subset of unselected access terminals, wherein the CDI of each of the access terminals in the subset has a low correlation with respect to the CDI of access terminals in the set; and
including the identified access terminal in the set;
create a beamforming vector for each access terminal in the set of selected access terminals; and
transmit a signal to each access terminal in the set using the created beamforming vectors.

* * * * *